Nov. 12, 1957     F. K. H. NALLINGER     2,812,751
AIR FILTER
Filed May 12, 1955
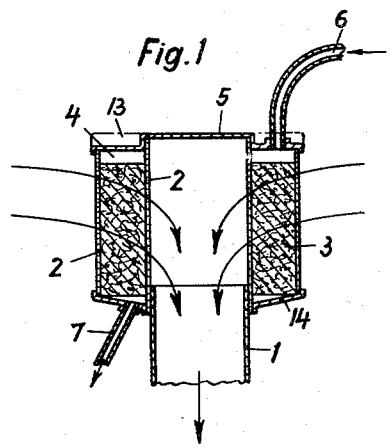
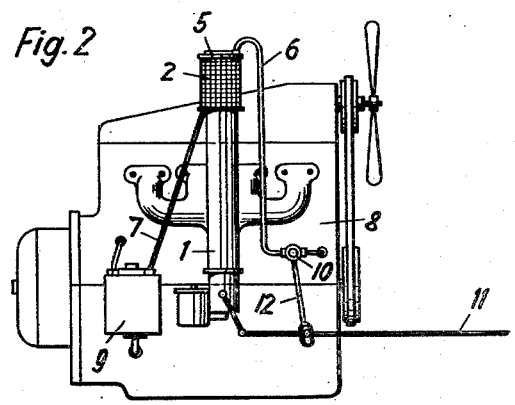
INVENTOR
FRIEDRICH K.H. NALLINGER
BY *Dicke and Craig.*
ATTORNEYS.

2,812,751
AIR FILTER

Friedrich K. H. Nallinger, Stuttgart, Germany, assignor to Daimler-Benz Aktiengesellschaft, Stuttgart-Unterturkheim, Germany Application May 12, 1955, Serial No. 507,815

In Germany October 25, 1948

Public Law 619, August 23, 1954
Patent expires October 25, 1968

2 Claims. (Cl. 123—119)

The present invention relates to improvements in air filters, especially for the intake air of internal combustion engines.

As compared with air filters which operate entirely by centrifugal force, oil bath air filters and oil saturated or wet-air filters have proved far more successful. However, oil bath filters are rather expensive, require considerable space, and do not sufficiently deaden the noise of the intake suction. Although the so-called wet-air filters have to be moistened with oil only occasionally, require less space, and may be easily combined with a silencer pot, they have the disadvantage that the oil easily evaporates, especially in summer, and that frequently it is overlooked or forgotten to remoisten them.

It is an object of the present invention to provide an oil-saturated or wet-air filter which overcomes the above disadvantages by supplying the filter with oil either arbitrarily or automatically, constantly or intermittently, so as to keep it sufficiently moist at all times.

According to the present invention, either a special oil container may be provided from which the oil flows by gravity or under pressure to the filter, or the filter may be connected to the central lubricating system of the car and thus be supplied with oil, or it may be similarly connected to the lubricating system of the engine. In the latter case, an oil line leading to the filter is preferably branched off through a pressure-regulating valve which either of its own accord constantly distributes the proper amount of oil to the filter in accordance with its dimensions, or adjustment, or which is connected with the accelerator, clutch, or brake pedal so as to be opened for a short time when such pedal is actuated. The excessive or dirty oil may then either be collected in a suitable container or discharged, or after passing through the oil filter of the oil-circulating system it may be returned to the latter.

Further objects, features, and advantages of the present invention will appear from the following detailed description of a specific embodiment thereof and the accompanying drawings, in which Fig. 1 shows a longitudinal section through a wet filter according to the invention, while Fig. 2 shows a side view of an automobile engine as seen from the side where the carburetor is mounted, but on a reduced scale as compared with Fig. 1.

Referring to the drawings, the upper end of the air-inlet duct 1 has attached thereto a filtering basket 2 having perforated cylindrical outer and inner walls between which a filter element 3 is mounted consisting, for example, of spun metal fabric, which is covered by a packing ring 4 made, for example, of wick yarn. The cover 5 of the filter basket 2 has a suitable socket thereon to which the oil feed line 6 may be connected. The bottom 14 of the filter basket 2 is slightly funnel-shaped and carries at its lowest point a drain pipe 7 leading in a downward direction.

As illustrated in Fig. 2, the oil feed line 6 is preferably branched off the lubricating circuit of the engine 8. The oil line 6 also contains a pressure-regulating valve 10 which may be controlled by the carburetor control rod 11, for example, through a slotted lever 12.

The operation of the filter according to the present invention will be clearly apparent from the drawings. When the carburetor control rod 11 is actuated, lever 12 also opens the valve 10 so that oil can flow to the filter 3 through the feed line 6. The wick ring 4 provides for a uniform distribution of the oil to the entire filter body 3. If desired, an additional oil distributing chamber 13 may be provided above the wick ring 4. From this ring 4, the oil penetrates slowly through the filter 2 in a downward direction, thus keeping it moist at all times, so that the air passing through the filter will always be properly cleaned. The oil moving constantly downwardly also keeps the filter itself in a clean condition.

Although the present invention primarily relates to an improvement of wet filters which are known as such, it is also applicable to oil-bath filters insofar as the oil supply thereof will thereby be constantly renewed.

Although my invention has been illustrated and described with reference to the preferred embodiment thereof I wish to have it understood that it is in no way limited to the details of such embodiment or to the specific examples described, but is capable of numerous modifications within the scope of the appended claims.

Having thus fully disclosed my invention, what I claim is:

1. In combination with an automobile having an engine, control means for operating said automobile and engine, a wet-air filter for cleaning the intake air for said engine, means for supplying oil to said filter so as to keep said filter sufficiently moist at all times, and means connected to said control means for adjusting said supply means in accordance with the adjustment of said control means.

2. In combination with an internal combustion engine having a lubricating circuit, a sound-absorbing tube on said engine, a wet-air filter for cleaning the intake air for said engine comprising a container attached to said tube, a metallic filter element in said container, an annular disk of wick yarn covering said filter element, a cover for said container, a pressure-regulating valve connected to said cover and to said lubricating circuit, means for cleaning the oil passed through said filter, a pipe connecting the bottom of said container with said oil cleaning means, and means for returning said oil to said lubricating circuit.

References Cited in the file of this patent

UNITED STATES PATENTS

| | | |
|---|---|---|
| 1,948,282 | Winslow | Feb. 20, 1934 |
| 2,012,962 | Hagar | Sept. 3, 1935 |
| 2,055,870 | Manning | Sept. 29, 1936 |